United States Patent Office 2,731,107
Patented Jan. 17, 1956

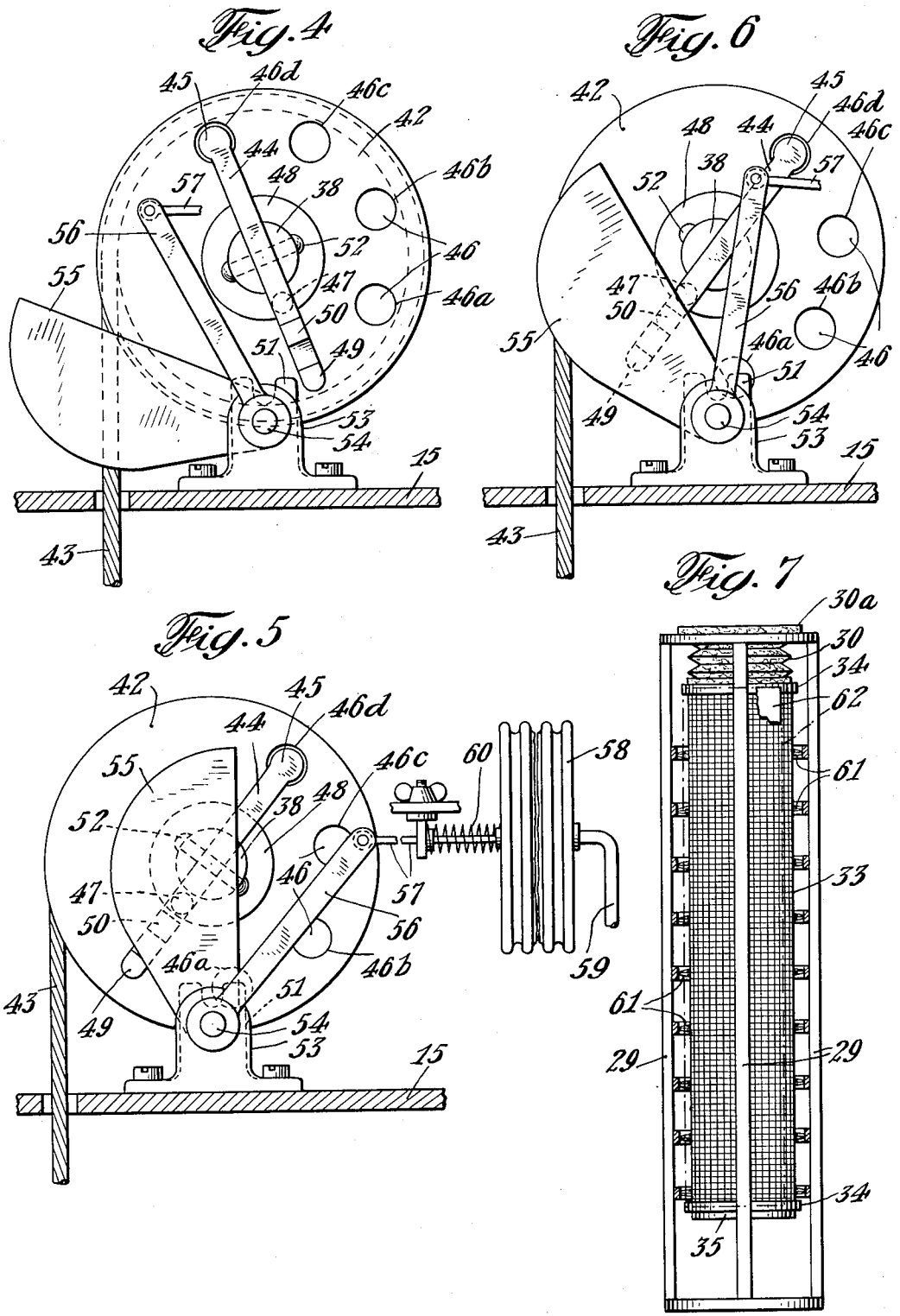

2,731,107

FILTER

Henry J. Hersey, Jr., Chatham, N. J.

Application May 7, 1954, Serial No. 428,243

12 Claims. (Cl. 183—61)

My present invention relates to apparatus for removing particles from gases in which they are entrained and more particularly to such apparatus commonly designated as dust filters utilized to remove dust from air to purify the same as well as such apparatus utilized in the recovery or removal of fine particles suspended or entrained in a gaseous atmosphere.

It is known that when a gas laden with solid particles is passed through porous filter material, the particles in time clog the pores of the filter material with a consequent reduction in capacity. As a result, it is necessary in one way or another to recondition the filter material so that the gas may pass through the same at the desired rate. It is also known that where relatively fine particles are being treated there is a serious loss in filter efficiency when new filters or improperly treated filters are utilized. This will be readily understood when it is appreciated that in the case of fine particle sizes the interstices or pores of even the best filter material presently available are large compared thereto and when a new, completely clean filter is put into service the filtration processes are relatively inefficient at first. As filtration continues, the porosity of the filter material decreases and the desired efficiency is not attained until some appreciable time after the start of the operation.

It is apparent from the foregoing that not only is it costly but also highly inefficient to replace filter elements where porosity has become so low as to be objectionable with thoroughly clean or new elements. Thus, numerous efforts have been made to provide means for cleaning or reconditioning the filter elements of a dust filter. The arrangements heretofore provided have included means for cleaning the filter elements in situ and certain refinements have made possible successive cleaning of the filter elements of a multi-element unit without shutting down the filter unit. However, especially where the median particle size of the dust is very small, such arrangements leave much to be desired.

One of the problems attending such apparatus is that of maintaining the porosity of the filter elements in a desired range so as to insure uniformity as well as high efficiency in the operation of the filter unit. Both excessive and insufficient cleaning result in wide fluctuations in the performance of the unit. Furthermore, variations in conditions such as humidity or the particle load of the gas being treated may require wide variations in the cleaning rate to insure continued optimum operation without shutting down the filter.

It has been found that by periodically causing a reverse flow of gas through the filter element, as by causing a counterflow of air through the entire element, sufficient of the particles which have accumulated to such an extent as to reduce the capacity of the element may be removed so as to reestablish the desired capacity without overcleaning. That is, sufficient particles remain so as to preserve filtering efficiency. By controlling the reverse flow in accordance with the degree to which the porosity of the filter elements has been reduced, both filtering capacity and filtering efficiency may be maintained under rather widely varying conditions.

It is therefore a principal object of my invention to provide a self-reconditioning filter unit in which the porosity of the filter elements is automatically maintained at a desired level during long periods of continuous operation.

Another object is to provide such apparatus which is compact and of simple construction.

A further object is to provide such an apparatus in which a counterflow as distinguished from a localized jet of gas or air is forced through all of one or more filter elements of a multiple element filter in a direction counter to that of the gas being filtered.

Yet another object is to provide such apparatus in which a counterflow of gas or air, produced simultaneously through substantially the entirety of one or more filter elements, is automatically controlled by the porosity of the filter elements themselves.

In accordance with my invention I provide means for producing a counterflow through the entirety of one or more filter elements of a filter unit. Furthermore, the intensity and periodicity of the counterflow is automatically controlled by variations in the porosity of the filter elements. Thus, in one embodiment, the filter unit has a plurality of filter elements in the form of tubular members open at one end. A rotatably mounted chamber or cylinder in which a plunger is reciprocable has an opening which registers in turn with the filter elements at least one by one. Drive means rotate the cylinder while a clutch mechanism serves to couple the plunger to the drive means when and to the degree called for by the pressure drop across the filter elements. Movement of the plunger in one direction serves to load a spring which, when the clutch mechanism releases, serves to forcibly propel the plunger in the opposite direction thereby creating the desired counterflow. The clutch mechanism together with the control means connected thereto determines the degree of travel of the plunger and hence whether and to what extent a counterflow is initiated.

Preferably, the area of the plunger and the volume under or swept out by the plunger are such that even a less than full plunger stroke initiates a counterflow which is both rapid and sudden thereby causing considerable physical agitation of the filter elements in addition to flowing through the pores thereof. To take full advantage of this I may mount the filter elements from resilient bellows-like members which are normally collapsed under the full weight of the filter element and accumulated dust but which expand when the filter elements are struck by the counterflow and contract to agitate additionally the filter elements.

Further objects as well as advantages of my invention will be apparent from the following description thereof in conjunction with the accompanying drawing in which:

Figure 4 is a sectional view through the line 4—4 of Figure 1 on an exaggerated scale;

Figures 5 and 6 are views similar to Figure 4 showing other positions of the members shown in Figure 4; and Figure 7 is a fragmentary elevational view of one of the filter elements and its mounting in which brushes are utilized to provide additionally a sweeping or wiping action.

Figure 1:
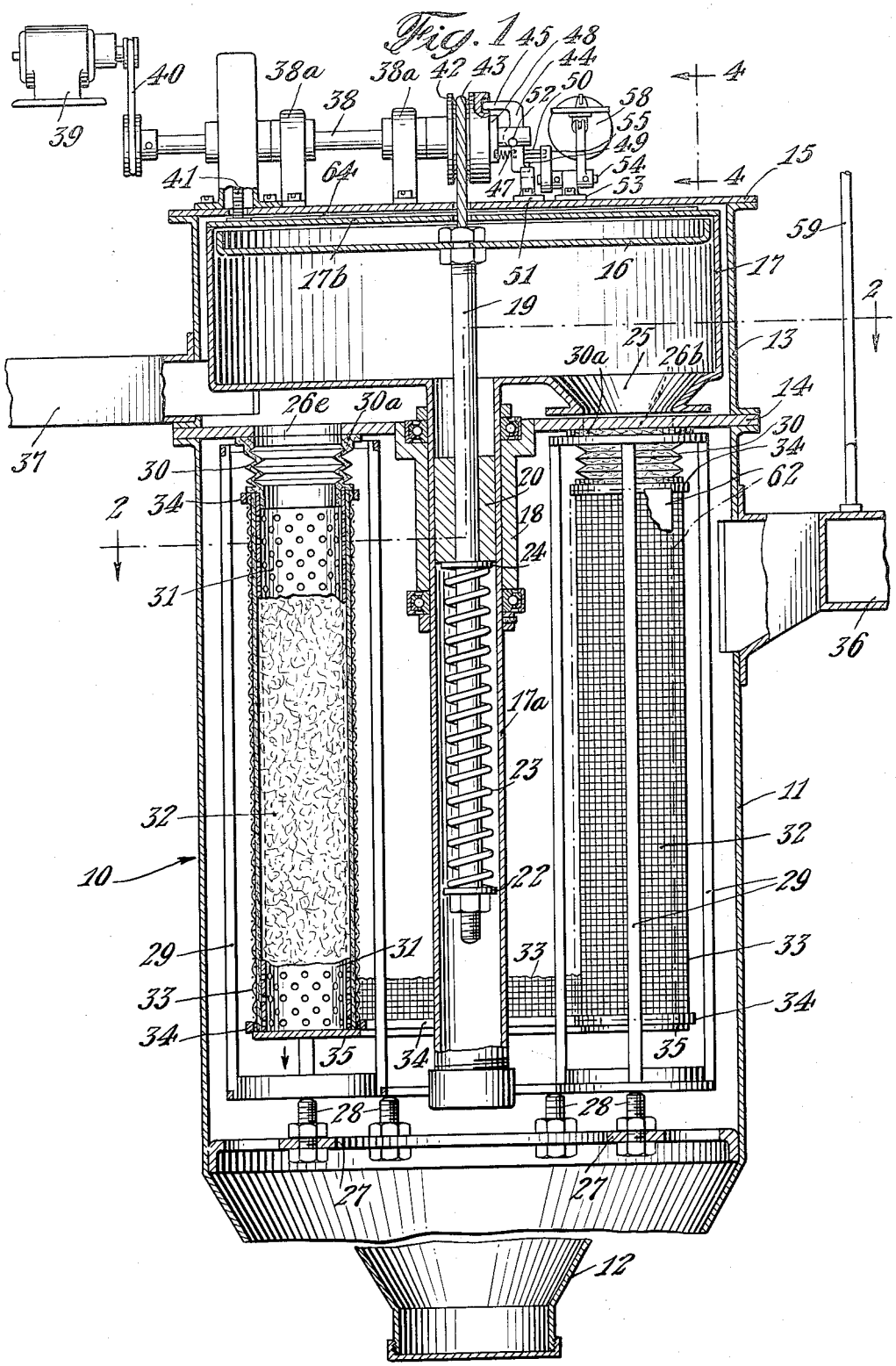
Figure 1 is a sectional view through the line 1—1 of Figure 2 of a filter unit constructed in accordance with my invention.
Figure 2:
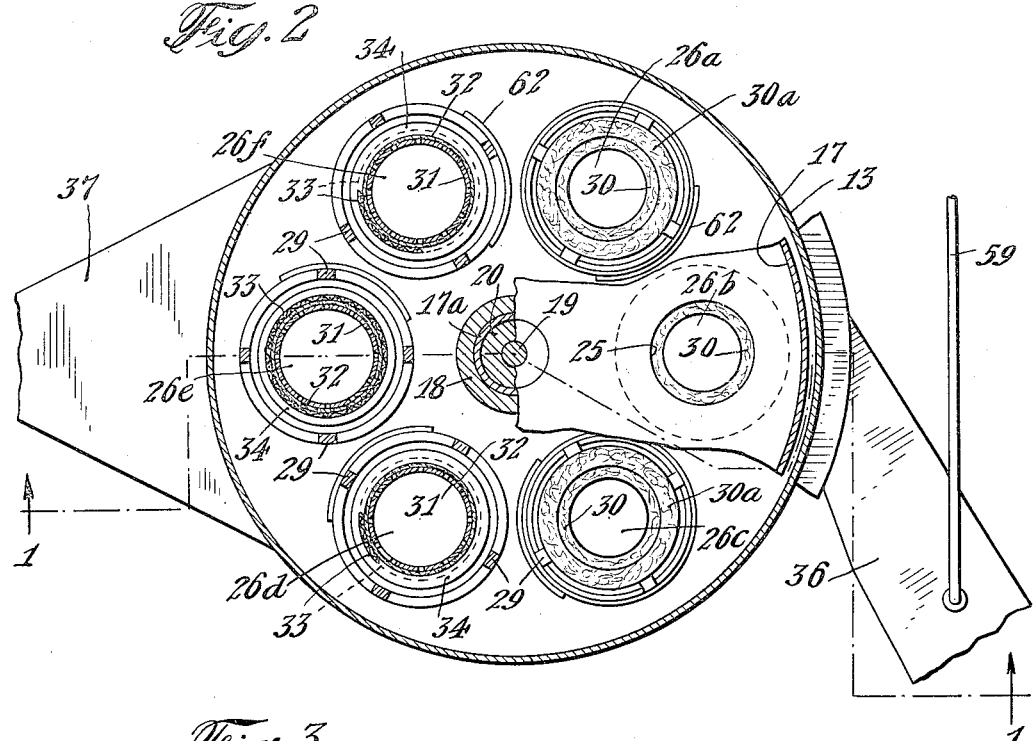
Figure 2 is a sectional view thereof through the line 2—2 of Figure 1.

Referring now to the drawing in detail, filter 10 comprises a generally cylindrical housing or body 11 closed at its lower end, as viewed in the drawing, by a collector or bin 12 into which dust or other particles may fall and from which they may be removed. Joined to the other end of housing 11 is a cylindrical member 13 with an apertured plate 14 secured between the adjacent portions of housing 11 and cylindrical member 13. Cylindrical member 13 is closed at its end remote from housing 11 by a plate-like cover member 15 which, as will be pointed out in detail, serves to support a drive means and control mechanism for actuating a piston-like plunger 16 translatable within cylindrical member 13. Mounted within cylindrical member 13 and enclosing plunger 16 is rotatable plunger housing 17 having an axially extending spindle-like portion 17a of reduced diameter seated in and extending through a hub 18 supported in a central aperture formed in apertured plate 14. Suitable bearings and retainers are provided, as indicated, to secure and facilitate rotation of spindle-like portion 17a.

Plunger 16 is secured to and translatable with a shaft 19 supported by a bushing 20 mounted in spindle-like portion 17a preferably within the portion thereof encompassed by hub 18 for structural reasons. Adjacent its end remote from plunger 16, shaft 19 carries a collar 21 movement of which in the direction away from plunger 16 is limited by a suitable stop such as nut 22. A coil spring 23 surrounds shaft 19 and extends from collar 21 to a second collar 24 which may abut bushing 20, as shown, or may otherwise be limited in its movement away from collar 21. Thus, when plunger 16 is raised in its housing 17, shaft 19 in its movement therewith serves to compress and load spring 23 between collars 21 and 24.

Plunger housing 17 is substantially closed except for an opening 25 formed in the bottom thereof through which the area under plunger 16 may communicate with one or more of the filter elements in turn, as will now be described. As shown, the center of opening 25 is offset from the axis of body 11 by an amount substantially equal to the radius of an annular array of openings 26a–f formed in plate 14. Openings 26a–f and opening 25 have substantially the same diameter. Adjacent the end of body 11 remote from plate 14 there are mounted a plurality of radially disposed support members 27 carrying an annular array of lock screws 28 each disposed to engage one end of a filter element cage 29 and urge the other end thereof into clamping engagement with the lip of one of the apertures 26. Cages 29 each comprise widely spaced members which extend in generally parallel relation, as shown. There is a cage 29 for each of the apertures 26 and each serves to engage and clampingly secure a flange 30a formed at one end of a bellows 30. To the other end of bellows 30 there is clamped a perforated or expanded metal filter element support 31 which serves to support filter element 32.

Bellows 30 may be formed of any suitable material sufficiently strong and resilient to support the filter element assembly and accumulated dust load and yet normally remain collapsed. In the present instance, bellows 30 is constructed of material suitable for high temperature operation, such as asbestos reinforced by helical spring steel wire. Flange 30a is formed by suitably molding the asbestos. Suitable filter materials vary with the type of installation and the conditions under which the operation is carried out, as is well known. Matted glass, asbestos fibres, wool felt, as well as other materials, may be utilized. Of course, such material as wool felt may not be utilized successfully where elevated temperatures are encountered. When the filter element is formed of material which is not sufficiently strong to withstand the counterflow, it may be held in place by a wire screen 33 or the like which is also secured by clamps 34. It will be noted that the lower extremities of filter elements 32 are closed as by metal discs 35 which may be part of the supports 31. As will be more fully described, the filter elements may be intermittently forced downward and this downward movement may cause the lower end thereof to strike against the respective cages 29 when an especially violent shake or jolt is desired. In that event, discs 35 receive the full force of the impact rather than the relatively fragile filter material.

Gas or air laden with particles is led into filter unit 10 through an inlet duct 36 tangentially disposed with respect to body 11 and communicating with the interior thereof. The fluid is under pressure in inlet duct 36 and due to the pressure differential across the filter normally passes through filter elements 32 where the particles are trapped and passes out through outlet duct 37. As shown, outlet duct 37 may, though not necessarily, open into cylindrical member 13 just below plunger housing 17; the fluid reaching the outlet duct through any of the openings 26 not in registration with opening 25 in plunger housing 17. In some instances, the outlet duct may be dispensed with and cylindrical member 13 may be left open to the atmosphere surrounding it.

The mechanism for initiating and controlling the counterflow which serves to maintain the filter elements in a substantially ideal condition will now be described in greater detail. A drive shaft 38, rotatably supported on cover member 15 by bearings 38a, is driven by means of a motor 39 connected thereto through a belt 40 and suitable pulleys. A gear drive including a pinion 41 is connected to drive shaft 38 with pinion 41 extending through cover member 15 to engage a ring gear 64 mounted on end wall 17b of plunger housing 17. Alternatively, pinion 41 may engage in holes formed in end wall 17b. In the present instance, with six filter element assemblies mounted in filter 10, the gear ratio between ring gear 64 and pinion 41 is six to one. Thus, for every six revolutions of drive shaft 38, plunger housing 17 will complete one traverse or revolution about its axis. Each revolution of drive shaft 38 brings opening 25 into registration with a different one of the openings 26. In practice, drive shaft 38 may be rotated relatively slowly and is therefore connected to motor 39 through a suitable speed reduction mechanism. If desired, other sequences and arrangements of the filter elements may be utilized. For example, every other filter element may be brought into registry with opening 25 in which case an odd number of filter elements may be utilized.

A pulley 42 is rotatably mounted on drive shaft 38 and normally does not rotate with the drive shaft. A wire rope or cable 43 is fixed to pulley 42 and to plunger shaft 19 and when pulley 42 rotates with drive shaft 38, rope 43 is wound on pulley 42 thereby raising plunger 16 and compressing spring 23. A clutch mechanism is provided to control engagement of pulley 42 with drive shaft 38 and includes a dog 44 rockably mounted on drive shaft 38 and conveniently supported in a slot formed in the end of drive shaft 38 by a pin 52 adjacent to pulley 42. Dog 44 has a laterally extending nose portion 45 on one side of its pivot point dimensioned to enter any one of a plurality of holes or recesses 46a–d formed in an array in the side of pulley 42 toward which nose portion 45 is biased by means of a spring 47 engaged between collar 48 fixed to drive shaft 38 and dog 44. On the other side of its pivot point and extending away from pulley 42, dog 44 carries two spaced apart lugs 49, 50. Dog 44 rotates with drive shaft 38 and lug 49 is positioned on dog 44 so as to engage a pedestal 51 having a cam surface and fixed to cover member 15. As most clearly shown in Figure 4, lug 49 engages the cam surface of pedestal 51 just before it reaches a vertical position and serves to rock dog 44 about its pivot to carry nose portion 45 away from pulley 42.

Figure 3:
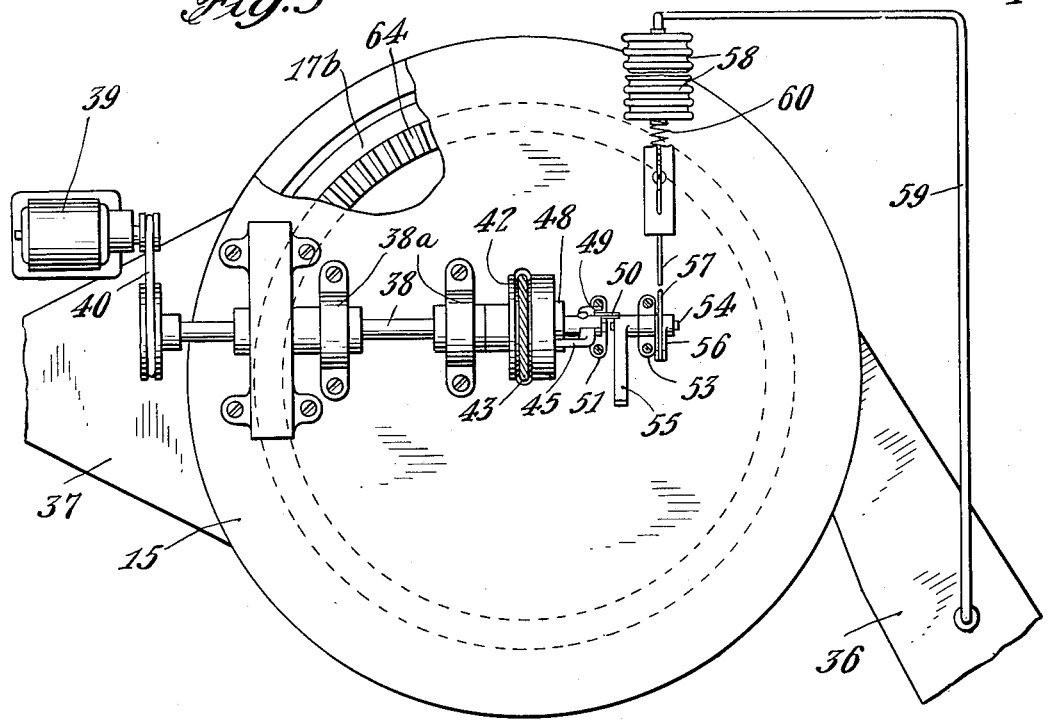
Figure 3 is a top plan view of the filter unit shown in Figure 1.

As shown most clearly in Figures 1 and 3, pedestal 51 is positioned adjacent to one side of pulley 42 so as to engage lug 49. A bearing block 53 rotatably supports a pivot pin 54 on the side of pedestal 51 away from pulley 42. Fixed to the end of pivot pin 54 presented toward pulley 42 is a cam plate 55 while to the opposite end thereof there is fixed a crank arm 56. Lug 50 is positioned on dog 44 so as to clear pedestal 51 as dog 44 rotates with shaft 38 and to engage cam plate 55. As will be noted, lug 50 is somewhat longer than lug 49 so as to extend beyond pedestal 51 and engage cam plate 55 after lug 49 has engaged and been urged inward by pedestal 51 but before lug 49 has cleared pedestal 51. The free end of crank arm 56 is connected by suitable linkage such as links 57 to one side of a bellows 58 the other side of which is fixed. Bellows 58 may communicate directly or, as shown, through a conduit 59 with the interior of inlet duct 36. Alternatively, conduit 59 may open into body 11 on the upstream side of the filter elements. Thus, expansion and contraction of bellows 58 is representative of the pressure on the upstream side of the filter elements and consequently displacement of the free side of the bellows varies with this pressure. Normally, variations of this pressure are indicative of variations in the pressure differential across the filter elements. As bellows 58 expands with increase of pressure, levers 57 serve to rotate crank arm 56 counterclockwise (Figures 4–6). Conversely, when bellows 58 contracts, crank arm 56 is rotated clockwise. Cam plate 55, being connected to crank arm 56 through pivot pin 54, partakes of this movement of crank arm 56 and its position relative to lug 50 of dog 44 varies, therefore, in accordance with the pressure in inlet duct 36 or on the upstream side of the filter elements and, consequently, the pressure differential across filter 10. In some installations, where the pressure on the downstream side of the filter elements differs markedly from that of the atmosphere, it may be necessary to enclose bellows 58 and immerse it in an atmosphere at the same pressure obtaining on the downstream side of the filter elements as by leading a conduit therefrom to the bellows enclosure. Alternatively, suitable pressure differential controllers are readily available. Assuming no variation in the condition of filter 10, the pressure on the upstream side will remain substantially constant since in normal practice the fluid in the inlet duct is led to the filter by a steady, substantially constant pressure source. Thus, when the porosity of the filter elements to the fluid varies in use, the pressure on the upstream side or the pressure differential across the filter will vary accordingly.

Variations in the porosity of the filter elements serves as a convenient measure of the effectiveness of the filtering operation. Thoroughly clean, fresh filter elements will have maximum porosity and a filtering efficiency somewhat below that desired. Therefore, when filter unit 10 is first put into operation with fresh filter elements, the pressure in inlet duct 36 will be at a correspondingly low level. The sensitivity of bellows 58 is adjusted as by varying the tension of calibrating spring 60 so that it is collapsed and unresponsive to this pressure. Since the efficiency of the filter elements increases with use as its porosity decreases due to trapping of particles within the filter material, there will be an increase in the pressure drop across the filter and a consequent increase in the pressure within inlet duct 36. As the operation continues, the filter will be performing with substantially maximum efficiency and this condition is represented by a given range of pressure values upstream and in the inlet duct 36 and by a range of pressure differential magnitudes which may vary somewhat with different filter materials but may be readily determined. For example, with the present installation a pressure differential across the filter corresponding to from 3 to 4 inches of water is suitable.

A further increase in pressure in the inlet duct 36 above the given pressure range is indicative of a loss in capacity due to choking and blinding of the filter material. Bellows 58 is adjusted to respond and expand as the pressure exceeds the desired range with a resultant clockwise rotation of cam plate 55. As shown in Figure 5, the various parts are in the position occupied thereby when the pressure in inlet duct 36 is below the upper limit of the desired operating pressure range. Plunger 16 is in its lowermost position and the tension of coil spring 23 on wire rope 43 maintains the same taut and the rope thereby holds pulley 42 against rotation while drive shaft 38 and dog 44 rotate under the influence of motor 39 which is now energized. Even when lug 49 has cleared pedestal 51, nose portion 45 is held out of engagement with holes 46 by reason of lug 50 being engaged by cam plate 55 as nose portion 45 traverses that portion of pulley 42 in which holes 46a–d are located. It is to be noted that as lug 50 clears cam plate 55, nose portion 45 in its corresponding position has progressed beyond the point at which it can enter the last of the holes 46a–d and it therefore slides along the smooth side surface of pulley 44 until lug 49 once again engages pedestal 51.

When the pressure drop across filter 10 has increased to just beyond the upper limit of the desired operating range, cam plate 55 reaches the position shown in Figure 6 and lug 50 clears the cam plate with each revolution of drive shaft 38 at a position relative to pulley 42 to permit nose portion 45 of dog 44 to engage in hole 46a. As thus engaged, pulley 42 is rotated about 200°, thereby raising plunger 16 a corresponding amount and compressing spring 23. At the same time, continued rotation of drive shaft 38 positions opening 25 of plunger housing 17 in registration with one of the openings 26a–f just as lug 49 again engages pedestal 51 to release pulley 42 and to permit spring 23 to urge plunger 16 downward to thereby deliver a relatively mild puff of air to the filter element 32 in registration with, say, opening 26a. The next revolution of drive shaft 38 serves to rotate plunger housing 17 just enough to position its opening 25 in registration with the opening 26f. During this revolution of the drive shaft, pulley 42 is again engaged and rotates about 200° to rewind rope 43 and raise plunger 16. Release of pulley 42 now results in delivery of air to the filter element under opening 26f.

As has been pointed out, the volume of air forced through each of the openings 26a–f in turn by movement of plunger 16 is sufficiently large and at such pressure that a counterflow of air takes place through the entire area of each of the filter elements 32 which results in an evenly distributed particle removing action. Preferably, for any particular installation the amount of air delivered when plunger 16 makes its minimum stroke is insufficient to restore the pressure drop across the filter to desired range under average operating conditions. Thus, when lighter-than-average conditions exist, overcleaning is avoided.

Under average or heavier-than-average conditions there will be a continued increase in the pressure drop across filter unit 10. This would indicate that the limited stroke of plunger 16 corresponding to engagement of dog 44 in pulley hole 46a has been insufficient to keep pace with the continuing decrease in capacity of the filter. Consequently, bellows 58 will continue to expand and thereby rotate cam plate 55 counterclockwise to permit dog 44 to engage pulley holes 46b, c or d and thereby increase the stroke of plunger 16. When dog 44 engages hole 46d, pulley 42 is wound about 315°, as shown in Figure 4; cam plate 55 now being positioned so that lug 50 does not come into engagement therewith and plunger 16 being raised to its full height before being released.

The relative size of the various parts will, of course, determine the nature of the counterflow for each position of the dog 44 relative to pulley 42. The force of the counterflow in any instance will cause expansion of the bellows 30 to produce shaking of the filter element simultaneously with the counterflow of air therethrough. As the stroke of the plunger 16 is increased the violence of the shaking action will be correspondingly increased. When conditions are such that the plunger approaches its maximum stroke, the bellows 30 may be so extended that the discs 35 will strike the bottoms of cages 29 to enhance the shock or particle disturbing action. The wide variation in cleaning rate afforded by the structure just described makes practical the maintenance of filter medium density at substantially the optimum level in spite of changing conditions which are so frequently encountered. This is particularly valuable when felted or matted filter mediums, such as wool felt, glass wool batting and the like, are employed.

As shown in Figure 7, I may mount a plurality of annular brushes 61 interiorly of each of the cages 29 with the bristles thereof surrounding and engaging the outer surface of filter elements 32 or at least engaging an excessive accumulation of particles thereon. Brushes 61 may be spaced apart axially relative to the filter elements a distance corresponding to the axial displacement of filter elements 32 when bellows 30 are each expanded about the average amount for any given installation. An advantage of the brushes 61 resides in the fact that they will tend to level the accumulated particles on the outer surface of the filter medium and actually may remove some of the particles thereby preventing the accumulation in certain spots of unduly thick accumulations which might offer such resistance to the counterflow and shaking operation as to persist in remaining on the filter medium, thus reducing its capacity. Also, such spotty accumulations would tend to concentrate the counterflow to those areas devoid of the unusual accumulations and perhaps cause overcleaning of some areas while others remain plugged or blinded by the unusual accumulations.

To avoid the immediate redeposit of particles removed from one filter element 32 onto an adjacent filter element, arcuate baffles 62 may be mounted on cages 29 intermediate adjacent filter elements. Alternatively, the baffles may be in the form of plate-like members radially disposed in housing 11 intermediate the adjacent filter assemblies.

It is to be understood that housing 11 as well as the junctions between it and other members such as apertured plate 14, cylindrical member 13 and inlet duct 36 and elsewhere may readily be rendered substantially gas-tight to avoid leakage of particle-laden fluid. Such connections are well known and need not be described in detail here.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A filter, comprising at least one porous filter element having an upstream and a downstream side, means for leading a particle-laden gas under pressure to the upstream side of said filter element, means adjacent to and communicating with the downstream side of said filter element defining a space having a volume which is large compared to the volume occupied by said filter element, a plunger mounted in said space for movement toward and away from said filter element, and means for rapidly moving said plunger through a distance such that it sweeps a volume which is large compared to that occupied by said filter element and compresses the gas under the same thereby to force gas suddenly to counterflow substantially simultaneously through all of said filter element against said pressure.

2. A filter, comprising at least one porous filter element having an upstream and a downstream side, means for leading a particle-laden gas under pressure to the upstream side of said filter element, enclosure means adjacent to and communicating with the downstream side of said filter element defining a space having a volume which is large compared to the volume occupied by said filter element, a plunger mounted in said space for movement toward and away from said filter element, plunger actuating means for rapidly moving said plunger toward said filter element through a distance such that it sweeps a volume which is large compared to that occupied by said filter element and compresses the gas under the same thereby to force gas suddenly to counter-flow substantially simultaneously through all of said filter element against said pressure, and means including pressure responsive control means for initiating operation of said plunger actuating means and varying the distance traveled by said plunger in accordance with said pressure.

3. A filter, comprising a generally closed body member, a plurality of filter elements having upstream and downstream sides and supported in said body member, means for leading a particle-laden gas under pressure into said body member on the upstream side of said filter elements, means for permitting egress of said gas on the downstream side of said filter elements, a housing in said body member and defining a space substantially closed off from said body member, said space having a volume which is large compared to that of any one of said filter elements, said housing having an aperture formed therethrough, means for successively registering said aperture and at least one of said filter elements whereby said downstream side of said one filter element communicates substantially solely with said space, a plunger mounted in said space and movable toward and away from said aperture and any one of said filter elements in registration therewith, and means for rapidly moving said plunger through a distance such that it sweeps a volume which is large compared to that of any one of said filter elements and compresses the gas under the same thereby to force gas suddenly to counterflow substantially simultaneously through all of the filter element in registration with said aperture against said pressure.

4. A filter, comprising a generally closed body, a plurality of filter elements having upstream and downstream sides and supported in said body, means for leading a particle-laden gas under pressure into said body on the upstream side of said filter elements, means for permitting egress of said gas on the downstream side of said filter elements, a housing in said body and defining a space substantially closed off from said body, said space having a volume which is large compared to that of any one of said filter elements, said housing having an aperture formed therethrough, means for successively registering said aperture and at least one of said filter elements, a plunger translatably mounted in said housing and having an effective area large compared to said aperture, and means for translating said plunger in said housing away from said aperture and rapidly toward said aperture through a distance such that the plunger sweeps a volume which is large compared to that of any one of said filter elements and compresses the gas under the same thereby to force gas suddenly to counterflow substantially simultaneously through all of the filter element in registration with said aperture against said pressure.

5. A filter, comprising a generally closed body, a plurality of generally tubular filter elements each open at one end thereof and having upstream and downstream sides, means resiliently supporting each of said filter elements in said body in spaced array, inlet means for leading a particle-laden gas under pressure into said body on the upstream side of said filter elements, outlet means for permitting egress of said gas and on the downstream side of said filter elements, a housing in said body and defining a space substantially closed off from said body, said space having a volume which is large compared to that of any one of said filter elements, said housing having an aperture formed therethrough having a size substantially equal to the open end of any one of said filter elements, means for successively registering said aperture and the open ends of said filter elements one by one, a plunger mounted in said space for movement toward and away from said aperture and having an effective area which is large compared to that of said aperture and the open end of any one of said filter elements, and means for rapidly moving said plunger toward said aperture through a distance such that it sweeps a volume which is large compared to that of any one of said filter elements and compresses the gas under the same thereby to force gas suddenly to counterflow substantially simultaneously through all of the filter element in registration with said aperture against said pressure.

6. A filter, comprising a generally closed body, a plurality of spaced filter elements having upstream and downstream sides and supported in a circular array in said body, means for leading a particle-laden gas under pressure into said body on the upstream side of said filter elements, outlet means for permitting egress of said gas and on the downstream side of said filter elements, a housing in said body and defining a space substantially closed off from said body, said space having a volume which is large compared to that of any one of said filter elements, said housing having an aperture formed therethrough, means rotatably supporting said housing on said downstream side of said filter elements, drive means, means for engaging said housing with said drive means for rotating said housing and successively registering said aperture with said filter elements, a plunger translatably mounted in said housing for movement toward and away from said aperture and having an effective area large compared to said aperture, plunger translating means engaging said plunger for rapidly moving the same through a distance such that it sweeps a volume which is large compared to that of any one of said filter elements, and means for releasably engaging said drive means with said plunger translating means, said plunger in its movement toward said aperture causing a counterflow therethrough and substantially simultaneously through the entire surface of said filter elements when in registration with said aperture and against said pressure.

7. A filter, comprising a generally closed body, a plurality of spaced filter elements having upstream and downstream sides and supported in a circular array in said body, means for leading a particle-laden gas under pressure into said body on the upstream side of said filter elements, outlet means for permitting egress of said gas and on the downstream side of said filter elements, a housing in said body and defining a space substantially closed off from said body, said housing having an aperture formed therethrough, means rotatably supporting said housing on said downstream side of said filter elements, drive means, means for engaging said housing with said drive means for rotating said housing and successively registering said aperture with said filter elements, a plunger translatably mounted in said housing for movement toward and away from said aperture and having an effective area large compared to said aperture, plunger translating means engaging said plunger, clutch means for releasably engaging said drive means with said plunger translating means, and means responsive to the pressure differential across said filter elements for controlling said clutch means, said plunger in its movement toward said aperture causing a counterflow therethrough and substantially simultaneously through the entire surface of said filter elements when in registration with said aperture and against said pressure.

8. A filter, comprising a generally closed body, a plurality of spaced filter elements having upstream and downstream sides and supported in a circular array in said body, means for leading a particle-laden gas under pressure into said body on the upstream side of said filter elements, outlet means for permitting egress of said gas and on the downstream side of said filter elements, a housing in said body and defining a space substantially closed off from said body, said housing having an aperture formed therethrough, means rotatably supporting said housing on said downstream side of said filter elements, drive means, means for engaging said housing with said drive means for rotating said housing and successively registering said aperture with said filter elements, a plunger translatably mounted in said housing for movement toward and away from said aperture and having an effective area large compared to said aperture, plunger translating means engaging said plunger, clutch means for releasably engaging said drive means with said plunger translating means which when so engaged serves to move said plunger away from said aperture, and means responsive to the pressure differential across said filter elements and for controlling said clutch means to thereby determine the movement of said plunger away from said aperture, said plunger in its movement toward said aperture causing a counterflow therethrough and substantially simultaneously through the entire surface of said filter elements when in registration with said aperture and against said pressure.

9. A filter, comprising a generally closed body, a plurality of spaced filter elements having upstream and downstream sides and supported in a circular array in said body, means for leading a particle-laden gas under pressure into said body on the upstream side of said filter elements, outlet means for permitting egress of said gas and on the downstream side of said filter elements, a housing in said body and defining a space substantially closed off from said body, said housing having an aperture formed therethrough, means rotatably supporting said housing on said downstream side of said filter elements, drive means, means for engaging said housing with said drive means for rotating said housing and successively registering said aperture with said filter elements, a plunger translatably mounted in said housing for movement toward and away from said aperture and having an effective area large compared to said aperture, plunger translating means engaging said plunger, clutch means for releasably engaging said drive means with said plunger translating means which when so engaged serves to move said plunger away from said aperture, and pressure-responsive means connected to said clutch means and responsive to the pressure differential across said filter elements for controlling said clutch means to thereby control the movement of said plunger away from said aperture, said plunger in its movement toward said aperture causing a counterflow therethrough and substantially simultaneously through the entire surface of said filter elements when in registration with said aperture and against said pressure.

10. A filter, comprising a casing, a plurality of generally tubular filter elements each having an open end, a plurality of resilient expansible tubular bellows members each connected to one of said filter elements adjacent the open end thereof, means supporting said bellows members and the filter elements connected thereto in a cylindric array, inlet means for leading a particle-laden gas under pressure into said body on the upstream side of said filter elements, outlet means for permitting egress of said gas and on the downstream side of said filter elements, partition means defining a space on said downstream side of said filter elements and having an aperture formed therethrough adapted for registration with at least one of said bellows members and the filter elements connected thereto, said space having a volume which is large compared to the volume enclosed by any one of said filter elements, means for successively registering said aperture and said bellows members and thereby putting said space in communication with the interior of said filter elements, a plunger translatably mounted in said space for movement toward and away from said aperture and having an effective area large compared to the cross-sectional area of any one of said filter elements, and means for translating said plunger in said space away from said aperture and rapidly toward said aperture through a distance such that the plunger sweeps a volume which is large compared to that enclosed by any one of said filter elements for causing a counterflow of gas substantially simultaneously through the entire surface of the filter element in registration with said aperture against said pressure.

11. A filter, comprising a casing, a plurality of generally tubular filter elements each having an open end, a plurality of resilient expansible tubular bellows members each connected to one of said filter elements adjacent the open end thereof, means supporting said bellows members and the filter elements connected thereto in a cylindric array, inlet means for leading a particle-laden gas under pressure into said body on the upstream side of said filter elements, outlet means for permitting egress of said gas and on the downstream side of said filter elements, partition means defining a space on said downstream side of said filter elements and having an aperture formed therethrough adapted for registration with at least one of said bellows members and the filter elements connected thereto, drive means, means for engaging said partition means with said drive means for rotating said partition means and successively registering said aperture with each of said bellows members and the filter elements connected thereto whereby said space communicates in succession with the interior of each of said filter elements, a plunger translatably mounted in said space for movement toward and away from said aperture and having an effective area large compared to the area of any one of said filter elements, plunger translating means engaging said plunger, clutch means for releasably engaging said drive means with said plunger translating means which when so engaged serves to move said plunger away from said aperture, and means responsive to the pressure differential across said filter elements and connected to said clutch means for controlling the same and thereby controlling the movement of said plunger away from said aperture, said plunger in its movement toward said aperture causing a counterflow therethrough and substantially simultaneously through the entire surface of said filter elements when in registration with said aperture and against said pressure, said counterflow causing said bellows members connected to the filter elements receiving said counterflow to expand and move the filter elements connected thereto.

12. A filter, comprising a casing, a plurality of generally tubular filter elements each having an open end, a plurality of resilient expansible tubular bellows members each connected to one of said filter elements adjacent the open end thereof, means supporting said bellows members and the filter elements connected thereto in a cylindrical array, inlet means for leading a particle-laden gas under pressure into said body on the upstream side of said filter elements, outlet means for permitting egress of said gas and on the downstream side of said filter elements, partition means defining a space on said downstream side of said filter elements and having an aperture formed therethrough adapted for registration with at least one of said bellows members and the filter elements connected thereto, drive means, means for engaging said partition means with said drive means for rotating said partition means and successively registering said aperture with each of said bellows members and the filter elements connected thereto whereby said space communicates in succession with the interior of each of said filter elements, a plunger translatably mounted in said space for movement toward and away from said aperture and having an effective area large compared to the area of any one of said filter elements, plunger translating means engaging said plunger, clutch means for releasably engaging said drive means with said plunger translating means which when so engaged serves to move said plunger away from said aperture and when released serves to rapidly move said plunger toward said aperture, means responsive to the pressure differential across said filter elements and connected to said clutch means for controlling the same and thereby controlling the movement of said plunger away from said aperture, said plunger in its movement toward said aperture causing a counterflow therethrough and through substantially simultaneously the entire surface of said filter elements when in registration with said aperture and against said pressure, and a plurality of spaced brushes contacting the outer surface of each of said filter elements, said bellows members expanding when the filter elements connected thereto receive said counterflow and thereby moving said filter elements relative to said brushes.

References Cited in the file of this patent

UNITED STATES PATENTS

| | | |
|---|---|---|
| 996,519 | Peter | June 27, 1911 |
| 1,516,444 | Lough | Nov. 18, 1924 |
| 2,391,534 | Yerrick et al. | Dec. 25, 1945 |

FOREIGN PATENTS

| | | |
|---|---|---|
| 9,390 | Great Britain | June 26, 1915 |
| 368,731 | Great Britain | Mar. 1, 1932 |
| 521,165 | Germany | Mar. 18, 1931 |
| 700,782 | Great Britain | Dec. 9, 1953 |
| 875,908 | Germany | May 7, 1953 |
| 1,040,053 | France | May 21, 1953 |